United States Patent [19]
Althaus

[11] Patent Number: 5,313,783
[45] Date of Patent: May 24, 1994

[54] GAS TURBINE PLANT

[75] Inventor: Rolf Althaus, Flawil, Switzerland

[73] Assignee: Asea Brown Boveri Ltd., Baden, Switzerland

[21] Appl. No.: 26,403

[22] Filed: Mar. 4, 1993

[30] Foreign Application Priority Data

Mar. 31, 1992 [DE] Fed. Rep. of Germany ....... 4210544

[51] Int. Cl.[5] .............................................. F02C 3/22
[52] U.S. Cl. ................................ 60/39.181; 60/39.465
[58] Field of Search ............... 60/39.02, 39.07, 39.181, 60/39.183, 39.465

[56] References Cited

U.S. PATENT DOCUMENTS

| 3,365,121 | 1/1968 | Phillips | 60/39.183 |
| 3,525,218 | 8/1970 | Buss . | |

FOREIGN PATENT DOCUMENTS

| 2848024 | 5/1980 | Fed. Rep. of Germany . | |
| 4109216A1 | 10/1991 | Fed. Rep. of Germany . | |
| 89757 | 5/1972 | German Democratic Rep. . | |
| 15917 | 2/1977 | Japan | 60/39.181 |
| 70921 | 5/1982 | Japan | 60/39.181 |
| 1071037 | 12/1985 | U.S.S.R. | 60/39.465 |

OTHER PUBLICATIONS

"Gasentspannungsturbinen in Ferngasleitungen", H. Bachl, BWK Bd. 5, Nr. 9, Sep. 1953, pp. 306–310.
"Nutzung von Druckenergie durch Gasexpansionsmotoren", G. Gneuss, Brennst.-Warme-Kraft 35 (1983) Nr. 10, Oct., pp. 428–432.
"Erdgasentspannungsturbinen zur Energieruckgewinnung fur erdgasbefeuerte Grosskraftwerke", Von U. Mohring, VGB Kraftwerkstechnik 63, May 1983, pp. 388–394.

Primary Examiner—Louis J. Casaregola
Attorney, Agent, or Firm—Burns, Doane, Swecker & Mathis

[57] ABSTRACT

In the case of a gas turbine, containing a turbine (10) and a compressor (11), it is intended
  a) to increase the efficiency of the individual components (10, 11),
  b) to reduce the undesired exhaust gases, i.e. NOx formation.

Means (21) of generating cooling air of higher quality are used. In particular, cooling air of higher quality can be generated by a booster (21) which contains a booster compressor (23) and a booster turbine (22). A further increase in efficiency is achieved by a heat exchangers (29, 30) on the booster (21). The booster turbine (21) is driven by the fuel and the booster compressor (23) compresses the compressed air generated in the compressor (12) to form the cooling air of higher quality. The advantage of this plant is the utilization of previously unused energy of natural gas.

3 Claims, 1 Drawing Sheet

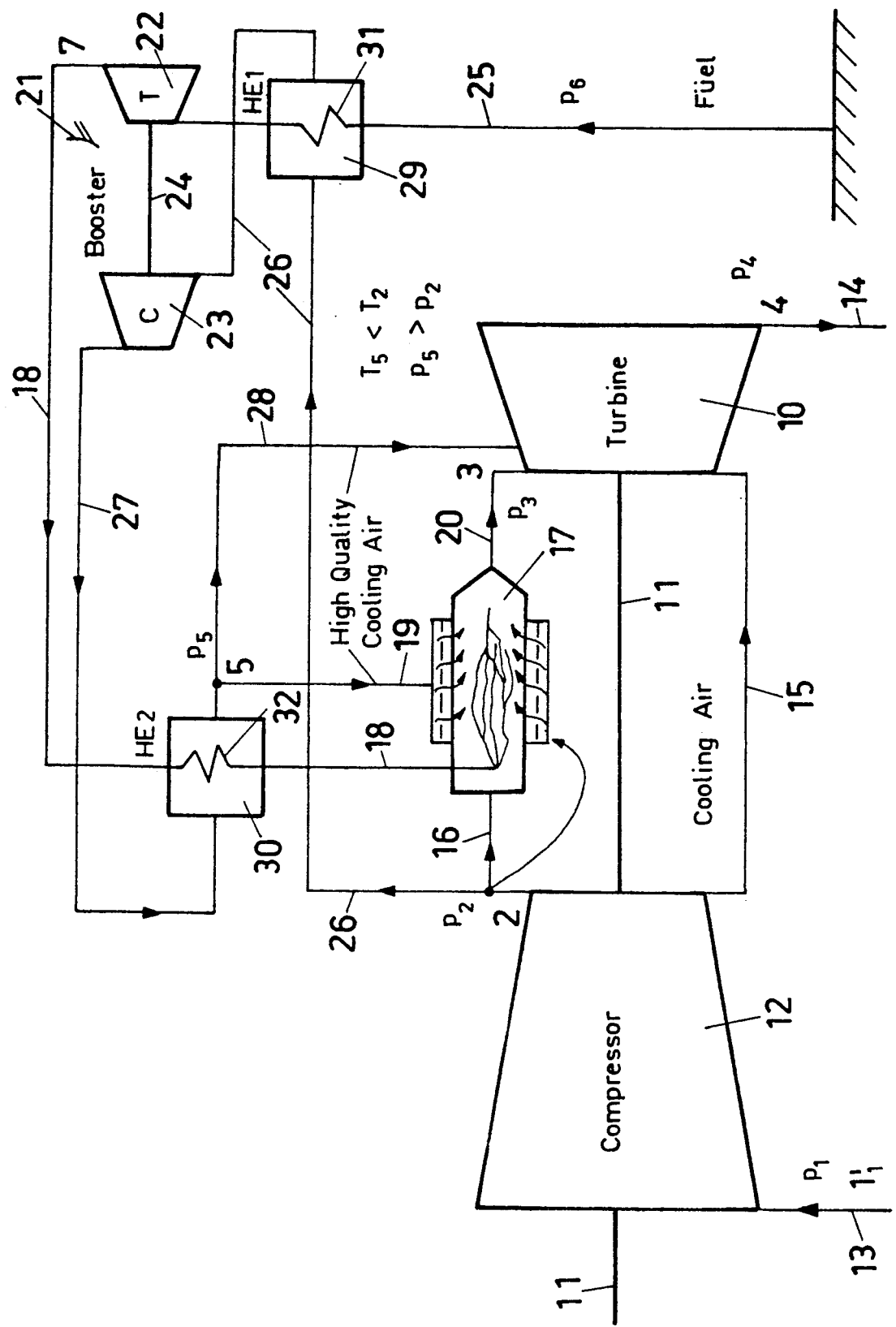

GAS TURBINE PLANT

BACKGROUND OF THE INVENTION

1. Field of the Invention

The invention relates to a gas turbine plant.

DISCUSSION OF BACKGROUND

It is usual to take the cooling air required for the parts of a gas turbine plant cooled by compressed air, in particular for the turbine and for the combustion chamber, from an already existing compressor.

SUMMARY OF THE INVENTION

Accordingly, one object of the invention is to provide a novel device for cooling individual parts of the gas turbine plant which impairs as little as possible the overall efficiency of the plant and ensures adequate cooling of these parts.

This object is achieved according to the invention by the gas turbine plant including a cooling air circuit for generating cooling air of high quality.

The advantage of this plant is the utilization of previously unused energy of natural gas, in particular the energy of flow of the natural gas and its temperature, which may be quite low. Consequently, new energy sources are used for generating the cooling air.

The use of means of generating cooling air of higher quality has the following advantages (cooling air of higher quality being intended to mean cooling air which is under a higher pressure p and at a lower temperature T than the cooling air usually used previously):

a) The use of cooling air of higher quality allows cooling air to be saved. The saved cooling air can participate in the combustion, whereby the average flame temperature is lowered, which has a positive effect on NOx formation. The cooling air is required in particular for cooling the combustion chamber and the turbine.

b) Lowering the proportion of cooling air allows the efficiency of the individual components—combustion chamber and turbine—to be improved significantly.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the single figure shows a gas turbine plant in diagrammatic representation.

DESCRIPTION OF THE PREFERRED EMBODIMENT

Referring now to the drawing, the plant has a turbine 10, which drives a compressor 12 via a shaft 11. The compressor 12 is fed air through a line 13. The exhaust gases leave the turbine 10 through a line 14. The compressed air or cooling air generated in the compressor 12 on the one hand passes through a line 15 directly into the turbine 10. On the other hand, the compressed air or cooling air generated in the compressor 12 passes via a line 16 into a combustion chamber 17. This combustion chamber 17 is supplied with fuel, for example natural gas, via line 18. In addition, this combustion chamber is supplied via a line 19. The gases generated in the combustion chamber 17 pass into the turbine 10 via a line 20.

To this plant described above there is then added a booster 21, which serves for generating cooling air of higher quality. This booster 21 has a booster turbine 22 and a booster compressor 23. The booster compressor 23 is driven by the booster turbine 22 via a shaft 24. The booster turbine 22 is supplied with fuel, for example natural gas, via a fuel line 25.

The fuel leaving the booster turbine via line 18 passes into the combustion chamber 17. The above-mentioned compressor 12 is connected via a further line 26 to the booster compressor 23. The cooling air of higher quality generated in the booster compressor 23 passes on the one hand via lines 27 and 19 into the combustion chamber 17 and on the other hand via lines 27 and 28 to the turbine 10.

To improve the efficiency of the plant just described, there are also two heat exchangers 29 and 30. The first heat exchanger 29 has a cooling coil 31, which is connected to the fuel line 25. The cooling air flowing in line 26 can be cooled by this heat exchanger. The second heat exchanger 30 has a cooling coil 32, which is connected to the fuel line 18. The cooling air contained in line 27 can be cooled by this second heat exchanger 30. The first heat exchanger 29 is connected via cooling-air line 26 to the compressor 12 and to the booster compressor 23. The second heat exchanger 30 is connected via cooling-air line 27 to the booster compressor 23 and via line 28 to the turbine 10.

The operating principle of the apparatus described is as follows:

The compressor 12, driven by the turbine 10, compresses air of pressure p1 to pressure p2. This compressed air of pressure p2 passes on the one hand as cooling air via line 15 into the turbine and on the other hand it is fed via line 16 to the combustion chamber 17 and permits there the combustion of the fuel fed from line 18. This compressed air p2 passes, furthermore, via line 26 to the first heat exchanger 29 of the booster 21. In the combustion chamber, a gas of pressure p3 is generated, which passes via line 20 into the turbine 10 and drives the latter. The turbine 10 can consequently drive the compressor 12 via shaft 11.

In order to improve the efficiency of the turbine 10 and of the combustion chamber 17, on the one hand cooling air of higher quality than the cooling air fed to the turbine 10 from the compressor 12 via line 15 is fed to the turbine 10 via line 28, and on the other hand likewise cooling air of higher quality is fed via line 19 to the combustion chamber 17. This cooling air of higher quality is generated by the booster compressor 23. The pressure of this cooling air increases in this case from the value p2 to the value p5. At the same time, the temperature of this cooling air is lowered from the value T2 to the value T5. In the first heat exchanger 29, the fuel is heated ahead of the booster turbine at the pressure p6. In the second heat exchanger 30, the fuel which leaves the booster turbine is further heated. The booster compressor 23 is driven by the booster turbine 22 via the shaft 24. The fuel, for example natural gas, is used for driving the booster turbine 22.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. A gas turbine plant for operation by natural gas fed to the plant by a pressurized line, comprising:
- a turbine;
- a compressor having a compressed air outlet, the compressor being driven by the turbine;
- a combustion chamber for supplying driving as to the turbine;
- a first compressed air line branching off the compressor outlet and connected to the combustion chamber for supplying combustion air;
- a second compressed air line branching off the compressor outlet;
- a first heat exchanger for cooling compressed air located in the second compressed air line;
- a booster compressor connected to the second compressed air line downstream of the first heat exchanger for further compressing the compressed air cooled in the first heat exchanger, the booster compressor being driven by a booster turbine driven by the pressurized natural gas;
- a second heat exchanger, downstream of the booster compressor for further cooling the compressed cooling air from the booster compressor, wherein compressed cooling air leaving the second heat exchanger is at a lower temperature and higher pressure than air leaving the compressor;
- a first cooling air line carrying compressed cooling air from the second heat exchanger to the combustion chamber; and,
- a second cooling line branching from the first cooling line carrying compressed cooling air to the turbine.

2. The gas turbine plant as claimed in claim 1, wherein the first heat exchanger is connected to the pressurized natural gas line upstream of the booster turbine so that the compressed air is cooled and the natural gas is heated.

3. The gas turbine plant as claimed in claim 1, wherein the second heat exchanger is connected to an exhaust line of the booster turbine so that the further compressed air is further cooled and the natural gas is further heated.

* * * * *